United States Patent [19]

Schaberg

[11] 4,157,032
[45] Jun. 5, 1979

[54] ELECTRICALLY ISOLATED STRAIN GAGE ASSEMBLY

[75] Inventor: Richard R. Schaberg, Ventura, Calif.

[73] Assignee: Gould Inc., Rolling Meadows, Ill.

[21] Appl. No.: 868,312

[22] Filed: Jan. 10, 1978

[51] Int. Cl.² .......................... G01L 1/22; G01L 9/04
[52] U.S. Cl. .................................. 73/141 A; 73/726;
338/4
[58] Field of Search ...................... 73/141 A, 720, 721,
73/726, 727; 338/4, 42

[56] References Cited
U.S. PATENT DOCUMENTS

| 3,444,736 | 5/1969 | Stedman | 73/720 X |
| 3,970,982 | 7/1976 | Kurtz et al. | 73/141 A X |
| 4,034,610 | 7/1977 | Biddle et al. | 338/4 X |

*Primary Examiner*—Charles A. Ruehl
*Attorney, Agent, or Firm*—George J. Netter; Charles E. Snee, III

[57] ABSTRACT

The described force transducer has its stress beam mechanism mounted to a transducer reference frame via a dielectric member having a thermal coefficient of expansion virtually identical to that of the beam. The stress beam carrying the thin-film strain gage thereon has a pair of link arms with shims spot welded to it, the outer ends of the shims and arm assembly are cemented (e.g., epoxy) to the dielectric frame member which is molded of, for example, glass bonded mica. A flexure is welded to a coupling which has an insulator rod cemented thereto, the entire assemblage transferring motion from an incoming force to be measured, to the stress beam. The dielectric frame is similarly cemented to the force transducer reference frame providing electrical isolation for the stress beam and included strain gage bridge carried thereon.

8 Claims, 6 Drawing Figures

ELECTRICALLY ISOLATED STRAIN GAGE ASSEMBLY

The present invention relates generally to a force transducer having a stress beam with a strain sensitive resistor bridge thereon, and, more particularly, to such a force transducer having improved electrical isolation of the stress beam and resistor bridge as well as excellent mechanical stability.

BACKGROUND OF THE INVENTION

An important form of force transducer includes a so-called strain gage which, upon being subjected to a deforming force or strain, experiences a modification of its electrical resistance. The degree of resistance change, upon rendering by electrical circuitry, provides a direct measure of the force being applied to the transducer. In the manufacture and prior to final assembly of such force transducers, the essential transducing element, which is at present constructed of a thin film bridge circuit, may encounter high level static electrical discharges during handling, and voltage transients from subassembly tests which can either destroy the thin-film resistance bridge or damage it substantially. Even with an installation of a protective diode after final assembly, the transducers are susceptible to transient high voltages that rise faster than the diode turn-on time and as well may occasionally be subjected to steady state high level potentials which are sufficient to cause the diodes to fail in being unable to dissipate the excess power.

SUMMARY OF THE INVENTION

In the practice of this present invention, there is provided a force transducer in which the stress beam mechanism is mounted to the transducer reference frame via a dielectric member having a thermal coefficient of expansion virtually identical to that of the beam. The stress beam carrying the thin-film strain gage thereon has a pair of link arms with shims spot welded to it, the outer ends of the shims and arm assembly are cemented (e.g., epoxy) to the dielectric frame member which is molded of, for example, glass bonded mica. A flexure is welded to a support and contact coupling, and a dielectric insulator is cemented to the coupling, the entire assemblage utilized to transfer motion from an incoming force to be measured, to the stress beam. The dielectric frame is similarly cemented to the force transducer reference frame providing electrical isolation for the stress beam and included strain gage bridge carried thereon.

DESCRIPTION OF A PREFERRED EMBODIMENT

Figure 1:
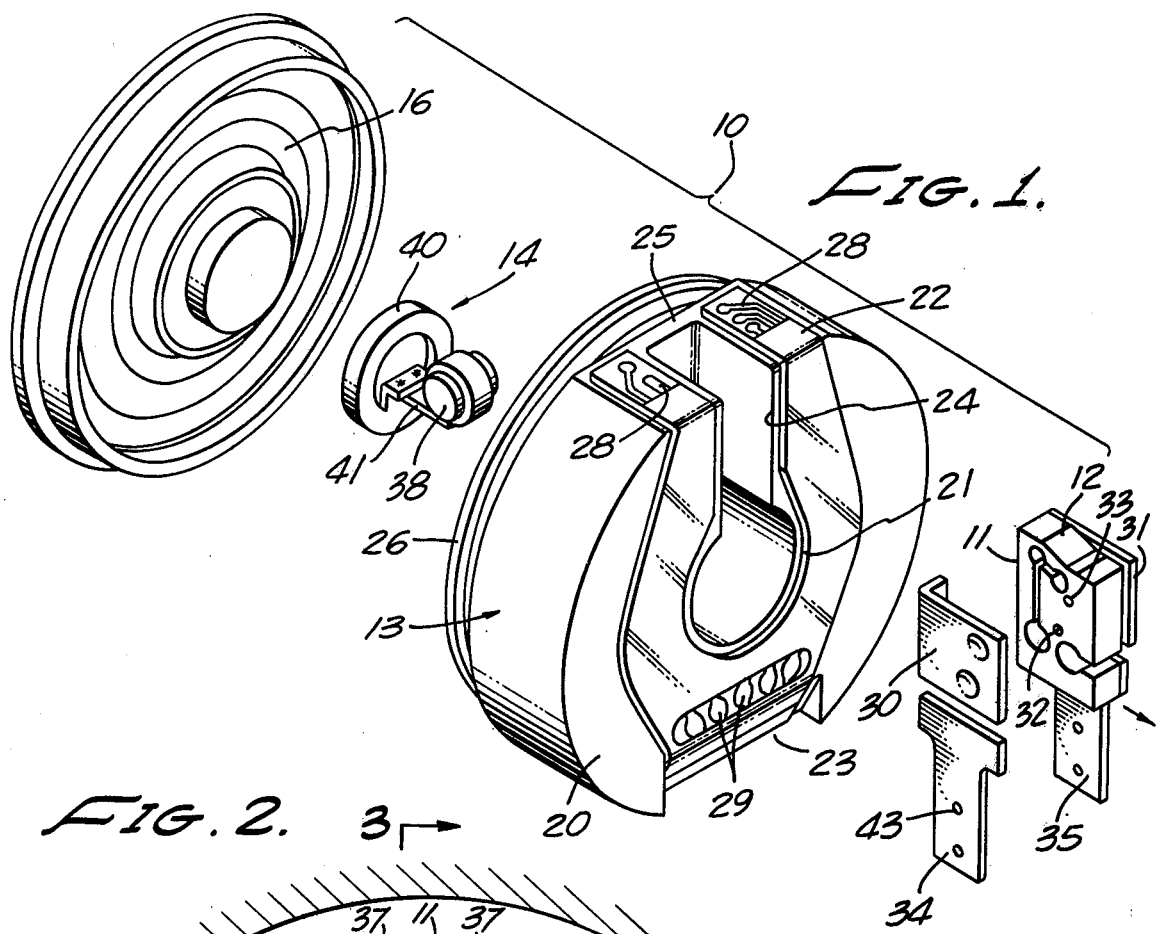
FIG. 1 is an exploded view of the force measuring transducer of this invention.
Figure 3:
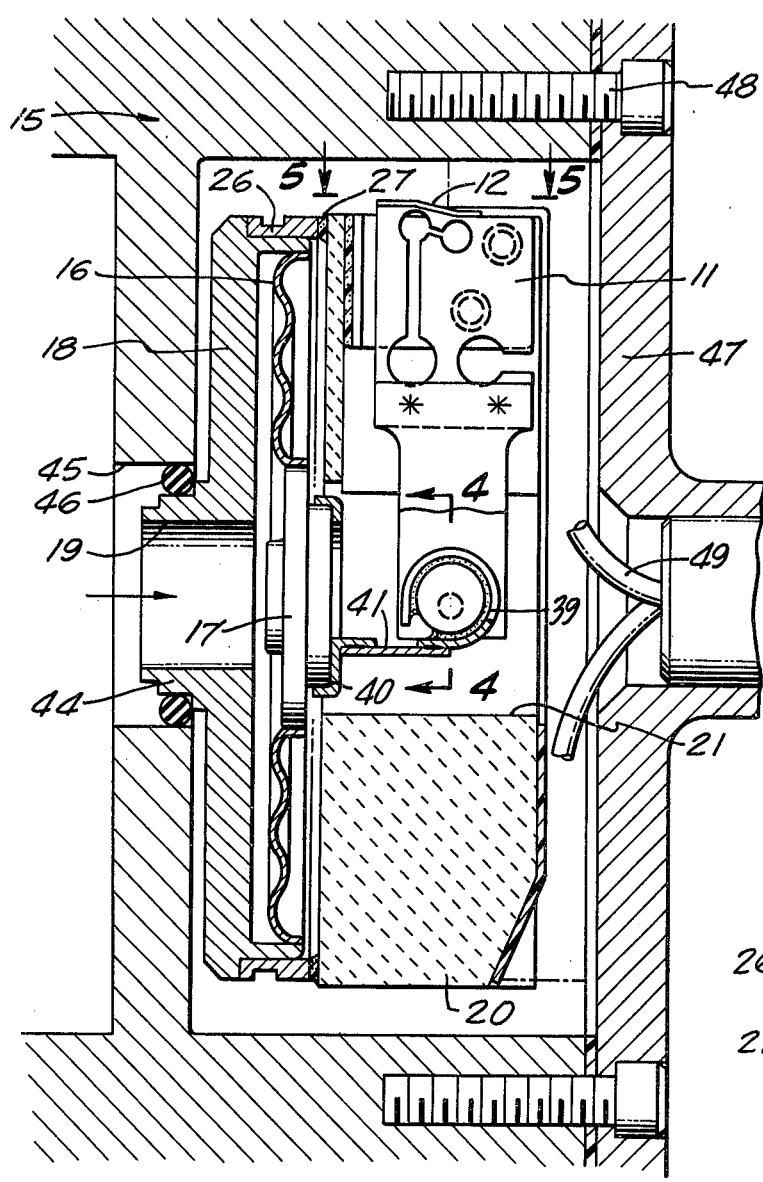
FIG. 3 is a side elevational, sectional view, taken along line 3—3 of FIG. 2.

Reference is now made to the drawing and particularly to FIGS. 1 and 3. The force transducer or load cell of the subject invention is identified generally as at 10. In its most general features it is seen to include a stress beam or beam flexure 11 on which a thin film resistance strain gage bridge is deposited on a surface thereof as at 12. The stress beam is interconnected by linkage to be described to transmit strains to the bridge, which, after electrical rendering, provides an electrical signal functionally related to the force to be measured. An isolation frame 13 contains assembled the stress beam 11 and force transmitting linkage 14 carried therewithin and provides the required isolation of these parts from both transients and normally to be expected high voltage signals which could damage the aparatus or substantially impair its operation and function. The entire assembly is contained within a casing 15 which is hermetically sealed to protect the force transducer from the ingress of possible harmful or damaging substances (e.g., moisture).

A force transmitting diaphragm 16, constructed of a flexible thin metal having good corrosion resistance, e.g., Monel or Hastelloy, is a means for transmitting an applied force to be measured (e.g., fluid pressure) to the transducer parts while at the same time isolating the transducer parts from the force exerting medium. The diaphragm is generally annular shape, with concentric corrugations or convolutions about a central axially located guide 17 having a disclike plates or contacts on both sides thereof. The diaphragm is received within a similarly dimensioned concave side of a cover or cap 18 having an axially located opening 19, the peripheral edge of the diaphragm being sealingly secured to the inner side wall surfaces of the cap 18 (e.g., welded).

An electrical isolation frame block 20 is of generally cylindrical shape with an axially extending circular opening 21 passing therethrough. The frame block is constructed of a material having exceptionally high electrical insulation qualities such as, for example, molded glass-bonded mica or a machinable glass-ceramic. The outer circumferential periphery is faced off at two places located at 180° from one another as at 22 and 23. A radially extending slot 24 is formed in the frame block front face communicating with the axial opening 21 and centrally aligned with the faced off peripheral portions 22, and extending substantially through the entire width of the block 20, leaving but a thin wall 25 on one face of the block 20. An annular rimlike member 26 is secured to the back circular face of the frame block 20 and is so located and of such dimension and geometry that a narrow edge or annulus of the block is left outwardly of the rimlike member. The member 26 also is so dimensioned as to permit receipt onto the edges of the cover 18, as can be seen best in FIG. 3. Moreover, the member 26 is secured to the frame block 20, by a suitable adhesive material such as epoxy, for example, as shown at 27.

On the circular surface opposite that containing the annular rim 26, a plurality of deposited interconnection leads 28 extend from the faced off portion 22 along the front circular surface of the block 20, terminating at connection pads 29 located on the same circular surface immediately adjacent the faced off region 23. As will be more particularly described, the interconnection leads 28 provide the means for interconnecting the strain gage 12 via pads 29 to external circuits for processing or otherwise utilizing the information obtained from the gage.

The stress-beam 11 may be similar to that disclosed in U.S. Pat. No. 3,765,256, LOW RANGE HIGH OVERLOAD DIFFERENTIAL PRESSURE TRANSDUCER by R. R. Schaberg, P. R. Perino and R. P. Helin. Briefly, the stress-beam includes a generally rectangular parallelpiped with a thin-film resistance strain gage deposited on an edge surface thereof as at 12. In a way that will be more particularly described, translation forces applied to the lower end of the stress-beam (arrow) with the upper part secured in place, result in the strains being produced in the gage 12 which produce corresponding changes in the electrical characteristics in the gage. A pair of support plates 30 and 31 are secured to the stress-beam, one on each side of the beam, at two points 32 and 33, with the plates being otherwise held spaced from the beam.

A pair of identical T-shaped extension plates 34 and 35 have their cross-bar portions secured to the lower part of the stress-beam on opposite sides of the beam. As can be seen best in FIG. 2, the overall width of the extension plates 34 and 35 when mounted on the beam 11 is such as to be located inwardly of the outermost parts of the support plates. Securement of the extension plates to the beam may be by a suitable cementitious material 36, such as epoxy, for example.

Figure 2:
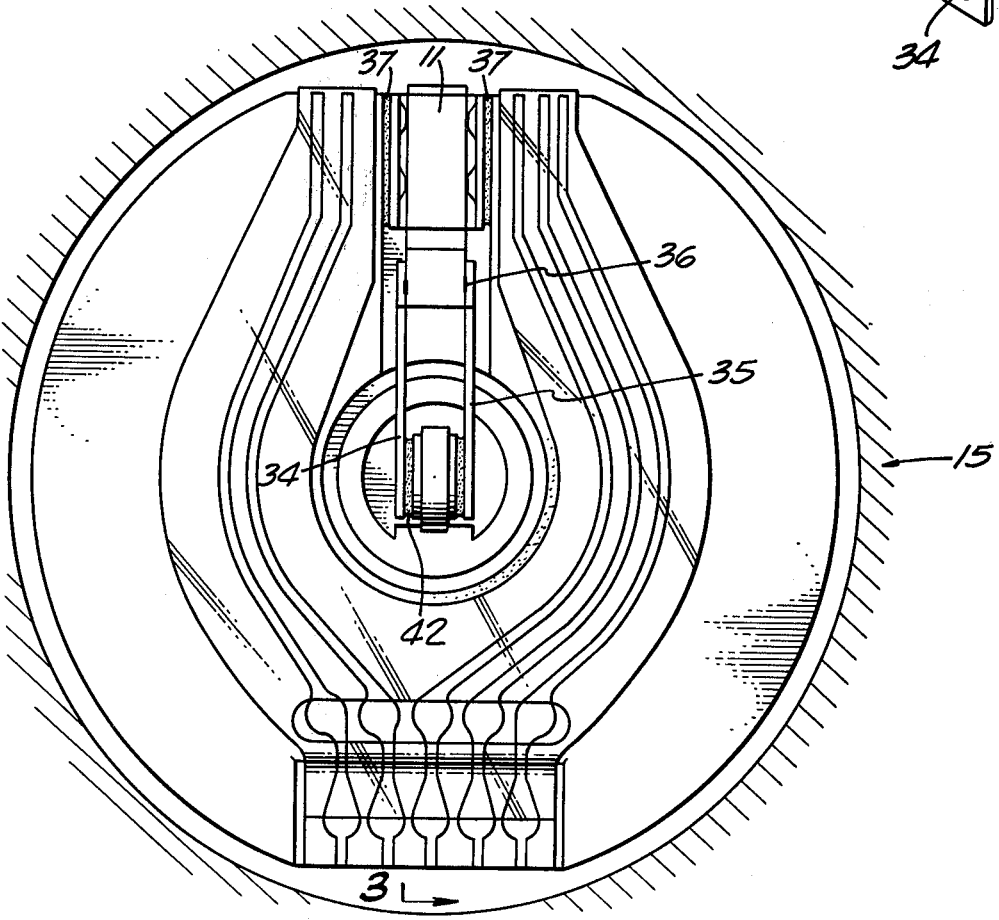
FIG. 2 is a sectional, elevational view of the assembled transducer.

The entire assembly of stress-beam 11, support plates 30 and 31 and extension plates 34 and 35 is located within the slot 24 of the dielectric frame block 20. As shown in FIG. 2, the outer surfaces of support plates are cemented to the walls of slot 24 as at 37 by, say, epoxy, with the top edge of the beam carrying the strain gage 12 being substantially coextensive with the faced off portion 22. By this mounting arrangement, movements of the outer ends of the extension plates 34 and 35 along the cylindrical axis of the frame block 20 produces a corresponding transverse bending moment through the strain gage, effecting known modification of the resistance parts thereof.

Figure 4:
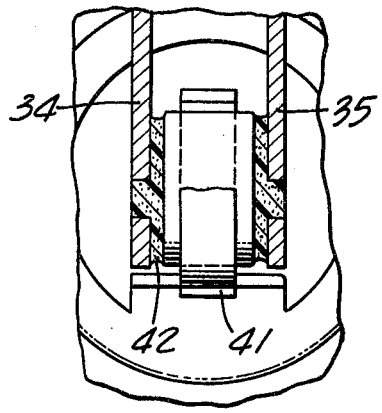
FIG. 4 is an end elevational, sectional view, taken along line 4—4 of FIG. 3.
Figure 5:
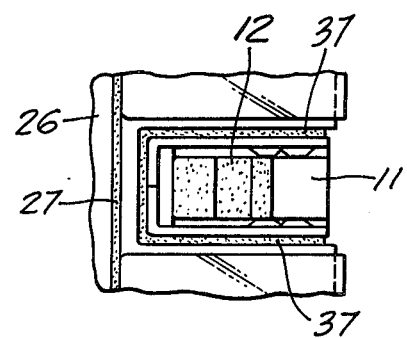
FIG. 5 is a top plan sectional view taken along line 5—5 of FIG. 3.

A cylindrical insulator rod 38 has a straplike metal coupling 39 circumferentially fitted thereabout and secured thereto by, say, an epoxy. An annular cap 40 of dimensions permitting fitting receipt onto the inner plate of the diaphragm guide 17 has one end of an elongated flexure 41 affixed to it by welding, for example, with the other end of the flexure being similarly welded to the coupling 39. The length of the insulator rod 38 enables placement between the lower ends of the extension plates 34 and 35 to which they are secured via a suitable cementitious material (e.g., epoxy) as at 42 (FIGS. 2, 4 and 5). The end portions of the extension plates are provided with openings 43 thereby providing additional anchoring of the extension plates to the insulator rod.

For the ensuing final assembly description, reference is made particularly to FIG. 3. As shown there, the stress-beam 11 with support plates, extension plates and insulator affixed thereto as already described, is secured within the frame block 20 and the rim 26 is received onto the cover 18. While so assembling, care must be taken to fit the annular cap 40 onto the inner plate of the diaphragm guide 17. Small gold wires (not shown) interconnect the film strain gage and the connection pads 28. Next, the force transducer just described is mounted within a protective casing 15 by inserting a necklike portion 44 of the cover 18 immediately adjacent the opening 19 within an opening 45 in the casing. On O-ring 46 hermetically seals the casing interior from fluid entry between the necklike portion 44 and the casing walls defining opening 45. A coverplate 47 is secured over the casing 15 by threaded means 48, to seal the interior. Cabling 49 passes through the coverplate to interconnect connection pads 29 to external circuits (not shown) for processing transducer changes.

In operation, a force to be measured (e.g., gas or liquid) applied through the cover opening 19, moves the diaphragm 16 in the direction of the arrow in FIG. 3. This diaphragm movement in turn moves the annular cap 40, flexure 41, insulator rod 38, the plates 34 and 35 and thereby strains the gage 12.

Figure 6:
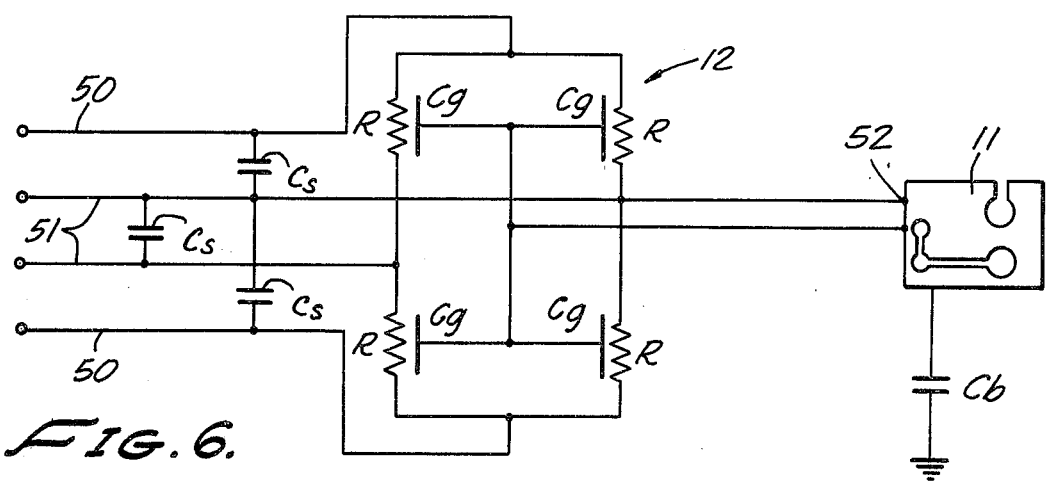
FIG. 6 is a schematic electrical circuit of the various electrical aspects of the force transducer of this invention.

With respect to the electrical protection aspects of this invention, reference is made especially to FIG. 6, where the strain gage 12 is shown schematically as consisting of four resistances R connected in a Wheatstone bridge arrangement. Input excitation to the bridge is made via leads 50 and output via 51. The deposited strain gage is typically separated from the beam 11 by an insulating layer and this is shown as a capacitance $C_g$. The frame block 20 separating the stress beam 11 from the casing forms another capacitance, $C_b$.

By directly connecting one of the output leads 51 to the stress beam as at 52, the maximum potential that will be applied across the strain gage insulating layer from normal excitation voltage applied to the bridge, will be one-half the excitation voltage. Transient voltages induced in either the input leads 50 or output leads 51 are capacitively attenuated by $C_g$ and $C_b$, which form, in effect, a capacitive voltage divider. In the event that for an anticipated voltage transient $C_g$ will not be sufficiently greater than $C_b$ to provide the necessary attenuation, supplementary capacitances $C_s$ may be added.

What is claimed is:

1. A force transducing apparatus, comprising:
   a first flexure having a strain gage resistance circuit thereon;
   an electrical isolation frame having an opening therein and a slot interconnecting with said opening;
   means for mounting said first flexure within said slot;
   at least one extension member affixed to said first flexure, said member extending into said opening; and
   force transmitting linkage means for applying a force to be transduced to said first flexure, said linkage means comprising an insulator rod secured to said at least one extension member, a coupling member secured to said rod, a force transmitting cap member and a second flexure secured to said cap and said coupling member, whereby forces applied to said cap member are resiliently transmitted to said first flexure and said resistance circuit.

2. Apparatus according to claim 1, wherein said electrical isolation frame and said first flexure have virtually identical thermal coefficients of expansion.

3. Apparatus according to claim 1, further comprising a force sensitive diaphragm, one side of which is connected to said cap member and the other side of which is subjected to a force to be measured.

4. Apparatus according to claim 1, further comprising a transducer housing cap having a centrally located opening and a force sensitive diaphragm secured to said cap to close said opening, said linkage means being connected to said diaphragm and said cap being connected to said isolation frame.

5. A force transducing apparatus, comprising:
a first flexure having a strain gage resistance circuit thereon;
an electrical isolation frame having an opening therein and a slot interconnecting with said opening;
means for mounting said first flexure within said slot;
at least one extension member affixed to said first flexure, said member extending into said opening; and
force transmitting linkage means for applying a force to be transduced to said first flexure, said linkage means comprising an insulation rod secured to said at least one extension member, a coupling member secured to said rod, a transducer cap and a second flexure responsive to a force to be transduced, said second flexure being mounted within said cap and secured to said coupling member, whereby forces applied to said second flexure are resiliently transmitted to said first flexure and said resistance circuit.

6. Apparatus according to claim 5, wherein said electrical isolation frame and said first flexure have virtually identical thermal coefficients of expansion.

7. Apparatus according to claim 5, wherein said second flexure is a force sensitive diaphragm, one side of which is connected to said coupling member and the other side of which is subjected to a force to be measured.

8. Apparatus according to claim 5, wherein said cap is connected to said isolation frame.

* * * * *